(12) United States Patent
Gersbach et al.

(10) Patent No.: US 11,421,549 B2
(45) Date of Patent: Aug. 23, 2022

(54) COOLED AIRFOIL, GUIDE VANE, AND METHOD FOR MANUFACTURING THE AIRFOIL AND GUIDE VANE

(71) Applicant: Ansaldo Energia Switzerland AG, Baden (CH)

(72) Inventors: Frank Gersbach, Ehrendingen (CH); Brian Kenneth Wardle, Brugg (CH); Iannis Buffart, Zürich (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 337 days.

(21) Appl. No.: 16/857,612

(22) Filed: Apr. 24, 2020

(65) Prior Publication Data
US 2020/0386120 A1 Dec. 10, 2020

Related U.S. Application Data

(62) Division of application No. 15/099,253, filed on Apr. 14, 2016, now abandoned.

(30) Foreign Application Priority Data

Apr. 14, 2015 (EP) .................................. 15163551

(51) Int. Cl.
*F01D 25/12* (2006.01)
*F01D 9/04* (2006.01)
(Continued)

(52) U.S. Cl.
CPC ............... *F01D 25/12* (2013.01); *B22C 9/24* (2013.01); *B23P 15/02* (2013.01); *F01D 5/141* (2013.01);
(Continued)

(58) Field of Classification Search
CPC ..... F01D 5/18–189; B22C 9/064; B22C 9/10; B22C 9/101; B22C 9/108;
(Continued)

(56) References Cited

U.S. PATENT DOCUMENTS 2,714,499 A 8/1955 Warner
3,026,605 A 3/1962 George
(Continued)

FOREIGN PATENT DOCUMENTS

CN 102016234 A 4/2011
EP 1553261 A2 7/2005
WO 2009118245 A1 10/2009

OTHER PUBLICATIONS

Office Action dated Apr. 18, 2019, by the Chinese Patent Office in corresponding Chinese Patent Application No. 201610394381.5, and an English translation thereof.

(Continued)

*Primary Examiner* — Jason L Vaughan
(74) *Attorney, Agent, or Firm* — Buchanan Ingersoll & Rooney PC

(57) ABSTRACT

Disclosed is a cooled airfoil having a hub end and tip, an airfoil height being defined between the hub end and the tip. The airfoil has a leading edge, trailing edge, suction side and pressure side. The airfoil has a first airfoil height section adjacent the hub end and extending towards the tip, wherein, in a meridional view, the leading edge and trailing edge are straight along the first airfoil height section. The airfoil has a second airfoil height section adjacent the tip and extending towards the hub end, wherein, in a meridional view, the airfoil is concavely shaped at the leading edge and is convexly shaped at the trailing edge along the second airfoil height section. At least one cooling channel has a length principally extending along the airfoil height, extends (Continued)

straight in a first cooling channel length section, and is bent in a second cooling channel length section.

2 Claims, 4 Drawing Sheets

(51) Int. Cl.
*B22C 9/24* (2006.01)
*F01D 5/18* (2006.01)
*F01D 5/14* (2006.01)
*B23P 15/02* (2006.01)
*B22D 25/02* (2006.01)

(52) U.S. Cl.
CPC .............. *F01D 5/187* (2013.01); *F01D 9/041* (2013.01); *B22D 25/02* (2013.01); *F05D 2220/32* (2013.01); *F05D 2220/3215* (2013.01); *F05D 2230/21* (2013.01); *F05D 2240/121* (2013.01); *F05D 2240/122* (2013.01); *F05D 2240/125* (2013.01); *F05D 2240/80* (2013.01); *F05D 2250/711* (2013.01); *F05D 2250/712* (2013.01); *F05D 2260/202* (2013.01)

(58) Field of Classification Search
CPC ................ B22D 19/0072; B22D 19/00; Y10T 29/49339; Y10T 29/49341; B23P 15/02; B23P 15/04
See application file for complete search history.

(56) References Cited

U.S. PATENT DOCUMENTS

| | | | |
|---|---|---|---|
| 4,289,191 A * | 9/1981 | Myllymaki | B29C 45/14836 425/573 |
| 4,862,947 A * | 9/1989 | Horton | B22C 3/00 164/122.2 |
| 5,088,892 A | 2/1992 | Weingold et al. | |
| 5,295,530 A * | 3/1994 | O'Connor | B22C 19/04 164/133 |
| 5,350,002 A * | 9/1994 | Orton | B29C 67/241 425/468 |
| 5,488,825 A | 2/1996 | Davis et al. | |
| 5,525,038 A | 6/1996 | Sharma et al. | |
| 5,820,774 A * | 10/1998 | Dietrich | B22C 9/10 164/369 |
| 5,868,194 A * | 2/1999 | Horwood | B22C 9/04 164/122.2 |
| 6,554,564 B1 | 4/2003 | Lord | |
| 6,631,561 B1 * | 10/2003 | Anding | F01D 5/187 29/889.721 |
| 6,761,529 B2 | 7/2004 | Soechting et al. | |
| 6,899,526 B2 | 5/2005 | Doloresco et al. | |
| 7,021,893 B2 | 4/2006 | Mongillo et al. | |
| 7,032,648 B2 * | 4/2006 | Bhangu | B22C 7/02 164/361 |
| 7,377,748 B2 | 5/2008 | Mongillo et al. | |
| 7,618,240 B2 | 11/2009 | Saltman et al. | |
| 7,673,669 B2 * | 3/2010 | Snyder | F01D 5/147 164/369 |
| 7,726,937 B2 | 6/2010 | Baumann et al. | |
| 8,167,567 B2 | 5/2012 | Kirchner et al. | |
| 8,459,934 B2 | 6/2013 | Hofmann et al. | |
| 8,506,256 B1 | 8/2013 | Brostmeyer et al. | |
| 8,678,757 B2 | 3/2014 | Li | |
| 8,702,398 B2 | 4/2014 | Breeze-Stringfellow et al. | |
| 8,801,366 B2 | 8/2014 | Dueckershoff et al. | |
| 9,011,084 B2 | 4/2015 | Ono et al. | |
| 9,017,036 B2 | 4/2015 | Straccia | |
| 9,387,533 B1 * | 7/2016 | Heneveld | B22D 29/001 |
| 9,506,347 B2 | 11/2016 | Key | |
| 9,581,028 B1 | 2/2017 | Jones et al. | |
| 9,726,021 B2 | 8/2017 | Straccia | |
| 11,021,964 B2 * | 6/2021 | Fromonteil | F01D 5/282 |
| 2001/0021343 A1 | 9/2001 | Kuwabara et al. | |
| 2002/0187043 A1 | 12/2002 | Liang | |
| 2002/0187061 A1 | 12/2002 | Arnold | |
| 2002/0189229 A1 | 12/2002 | Hidaka et al. | |
| 2003/0014972 A1 | 1/2003 | Arnold | |
| 2003/0072649 A1 | 4/2003 | Kuhne | |
| 2005/0191167 A1 | 9/2005 | Mongillo et al. | |
| 2007/0041841 A1 | 2/2007 | Walter et al. | |
| 2007/0154318 A1 | 7/2007 | Saltman et al. | |
| 2007/0224033 A1 | 9/2007 | Mongillo et al. | |
| 2007/0243068 A1 | 10/2007 | Wadia et al. | |
| 2011/0103932 A1 | 5/2011 | Dueckershoff et al. | |
| 2012/0076646 A1 | 3/2012 | Ono et al. | |
| 2013/0177397 A1 | 7/2013 | Burdgick et al. | |
| 2013/0224040 A1 | 8/2013 | Straccia | |
| 2014/0079542 A1 | 3/2014 | Bullied et al. | |
| 2015/0017011 A1 | 1/2015 | Boeck et al. | |
| 2015/0285080 A1 | 10/2015 | Huebner et al. | |
| 2015/0322798 A1 | 11/2015 | Bauer et al. | |
| 2015/0337664 A1 | 11/2015 | Cosi et al. | |
| 2016/0201468 A1 | 7/2016 | Krishnan et al. | |
| 2017/0298760 A1 | 10/2017 | Vallino | |
| 2018/0100399 A1 | 4/2018 | Peeren et al. | |
| 2018/0216528 A1 | 8/2018 | Linassier et al. | |
| 2018/0252113 A1 | 9/2018 | Northall et al. | |
| 2018/0252231 A1 | 9/2018 | Northall et al. | |
| 2019/0153881 A1 | 5/2019 | Seo et al. | |

OTHER PUBLICATIONS

Extended European Search Report dated Oct. 1, 2015, by the European Patent Office in European Patent Application No. 15163551.3 (6 pages).

* cited by examiner

COOLED AIRFOIL, GUIDE VANE, AND METHOD FOR MANUFACTURING THE AIRFOIL AND GUIDE VANE

CROSS REFERENCE TO RELATED APPLICATION

This application is a division of U.S. application Ser. No. 15/099,253, filed Apr. 14, 2016, incorporated herein by reference in its entirety.

TECHNICAL FIELD

The present disclosure relates to a cooled airfoil. It further relates to a guide vane comprising an airfoil of the aforementioned type and a method for manufacturing the airfoil and the guide vane.

BACKGROUND OF THE DISCLOSURE

In modern gas turbine engines, in order to further improve efficiency, the demand is increased to align the profile of airfoils with the actual flow inside the engine. A demand is thus to adapt airfoil geometry to the axially divergent flow associated with the divergent hade angles.

It is known from the art of steam turbines to provide airfoils with a 3-dimensionally curved and moreover twisted geometry. Document US 2012/0076646 discloses a steam turbine guide vane which is curved in an axial view as well as in a meridional view. The curvature in the meridional view is concentrated at the vane tip, that is, the radially outer part, and is curved in an S-shaped manner in an axial view. However, in striving for adapting said aerodynamic teaching to a vane in the hot gas path of a gas turbine engine, certain problems arise related to the need of providing internal cooling channels running along the length of and inside the airfoil, that is, extending a length between the hub end and the tip of the airfoil. It is desired to provide cooling channels following the geometry of the leading edge and the trailing edge. It is further desired to provide a wall thickness as small as possible from a structural integrity standpoint. The smaller the thickness of the walls, in particular at the leading edge and the trailing edge, is, the more efficient coolant provided in said cooling channel is used. However, a demand for higher manufacturing precision is related with a small wall thickness.

Certain challenges are thus related to manufacturing said cooling channels inside the airfoil. Small wall thickness may only be achieved with small manufacturing tolerances when manufacturing the airfoil with internal cooling channels, usually by a casting process. Differential thermal expansion between a mold provided to generate the outer airfoil geometry and a core provided to generate the internal cooling channels result in comparatively large wall thickness tolerances if said differential thermal expansion becomes effective in a direction across the core, that is, across the cooling channels to be manufacture.

Lineout of the Subject Matter of the Present Disclosure

It is an object of the present disclosure to provide a cooled airfoil and guide vane for a gas turbine, having a geometry which allows both improved aerodynamic properties and efficient use of cooling fluid.

It is a further object of the present disclosure to provide a cooled airfoil and guide vane which may be provided with a wall thickness of the walls delimiting the cooling channels and forming the outer body of the airfoil which is as small as possible with consideration of structural integrity and the required stiffness.

It is still a further object of the present disclosure to provide a cooled airfoil and guide vane which may be produced with tight tolerances of the location and dimension of the internal cooling channels.

In a further aspect, there is a demand for a method for manufacturing the airfoil and guide vane as described, in particular by casting, with the required small tolerances.

Further effects and advantages of the disclosed subject matter, whether explicitly mentioned or not, will become apparent in view of the disclosure provided below.

Disclosed is a cooled airfoil, the airfoil comprising a hub end and a tip, an airfoil height being defined between the hub end and the tip. It is understood that a turbine airfoil is intended for a specific use in an engine, with one end of the airfoil adapted and dedicated for the use at a radially inner end of the turbine working fluid flow channel, or, in other word facing the rotor or the hub, and thus forms a hub end of the airfoil, while the other end is adapted and dedicated for being placed at the radially outer side of the working fluid flow channel, that is, at the turbine stator or housing, thus forming a tip of the airfoil. Hub end and tip are thus clear and unambiguous terms for the skilled person. The airfoil further comprises a leading edge, a trailing edge, a suction side and a pressure side. It is understood that the pressure side of the airfoil is provided by a generally concave surface extending between the leading edge and the trailing edge, while the suction side is provided by a generally convex surface extending between the leading edge and the trailing edge. The airfoil comprises a first airfoil height section adjacent the hub end and extending towards the tip, wherein, in a meridional view, the leading edge and the trailing are straight at least along the first airfoil height section, and the airfoil comprises a second airfoil height section adjacent the tip and extending towards the hub end, wherein, in a meridional view, the airfoil is concavely shaped at the leading edge and is convexly shaped at the trailing edge along the second airfoil height section. Said straight and bent sections of the leading edge and the trailing edge may in another aspect of the present disclosure be defined on hub-side sections of the leading edge and the trailing edge, respectively, and tip side sections of the leading edge and trailing edge, respectively. Again, by virtue of the intended use of the airfoil and an airfoil outer shape being shaped and dedicated to be placed in the hot gas path of a turbine in an unambiguous manner and orientation, the term meridional view provides a clear teaching. At least one cooling channel is provided within the airfoil and has a length principally extending along the airfoil height. It is understood that a multitude of cooling channels may be provided, which may be provided in series to provide one common coolant flow path. For instance, one of the channels may open out to the exterior of the airfoil at a longitudinal end in order to receive coolant, and be intended to be provided in fluid communication with a gas turbine coolant supply, while the other longitudinal end of said channel is in fluid communication with a further cooling channel. The cooling channels may be provided with openings in their sidewalls which open out to the airfoil outer surface. Thus, coolant may be discharged from the thus formed coolant flow path and/or film cooling air may be provided for the airfoil. In particular, a last coolant channel, in the direction of coolant flow, may be arranged at the trailing edge and be provided with wall openings in order to discharge the coolant and thus provide additional cooling for the trailing edge. The at least one cooling channel extends straight at least in a first cooling channel length section, and is bent in a second cooling channel length section, wherein a cooling channel wall provided on the leading edge side is convexly shaped in the meridional view of the airfoil, and a cooling channel wall provided on the trailing edge side is concavely shaped in the meridional view of the airfoil. In particular, the first cooling channel length section may be provided in the first airfoil height section and the second cooling channel length section may be provided in the second airfoil height section. That is, a cooling channel, and in particular embodiments all cooling channels, follow the general shape of the leading edge and the trailing edge. In other words, a cooling channel or a multitude of cooling channels is or are straight in sections of the airfoil where the airfoil leading edge and/or trailing edge are straight, and is bent in regions where the airfoil leading and trailing edge are bent.

In an aspect of the herein disclosed subject matter, the leading edge and trailing edge in the straight section are not required to be straight in the sense of not being allowed to deviate from an exactly straight line within a microns' range. However, the leading edge and/or the trailing edge, and/or the cooling channels, in the respective straight section is or are considerable less curved than in the bent section. In a meridional view, as well as in an axial view, as will be lined out in more detail below, a radius of curvature of any of said structures in a straight section, or in the first airfoil height section, may for instance be at least five times the radius of curvature of a corresponding structure in the bent section or second airfoil height section.

Said airfoil, due to its specific geometry, may be particularly well manufactured in applying a method comprising providing a mold, said mold being provided to generate the outer surface shape at least of the airfoil in a casting process, providing at least one core, said core being provided to generate at least one internal cooling channel in the airfoil in the casting process, wherein each of the mold and the core comprise a hub end and a tip end, and an airfoil length extending between the hub end and the tip end. It is understood, that hub end and tip end relate to the ends of the airfoil to be manufactured, which in turn are related to the specific use for which the airfoil is adapted and intended. The mold comprises a mold cavity, which is defined as space in which material is introduced when casting the component. Each of the mold cavity and the core comprise a straight section provided adjacent the respective hub end and a bent section provided adjacent the respective tip end, when seen in a meridional view of the airfoil or vane to be manufactured. It is understood that the mold cavity straight and bent sections are considered to be sections where the mold provides straight or bent delimiting walls for a casting process. The method further comprises placing the core inside the mold cavity, placing the core bent section inside the mold cavity bent section, placing the core straight section inside the mold cavity straight section; and attaching the core to the mold in a fixed bearing relationship at the core tip end and attaching the core to the mold in a floating bearing relationship at the core hub end, such that the core hub end is enabled to displace relative to the mold along a lengthwise direction of the core straight section at the hub end, and is fixed relative to the mold in any direction across the lengthwise direction of the core straight section. As an effect, the core, in response to differential thermal expansion with the mold, as may arise during a casting process, will only displace minimally relative to the mold in the region where it is bent, and displaces along a lengthwise direction of the core in the straight section. Displacement along the lengthwise direction in the straight section does not result in dimensional changes, while the lever along which displacement becomes effective is small in the curved or bent section of the core, in turn largely limiting dimensional tolerances of the airfoil walls due to differential thermal expansion of the core and the mold. In applying this method, which in turn requires the airfoil geometry lined out in connection with the device described above, it is possible to manufacture the airfoil with tight tolerances of the airfoil walls, which in turn enables manufacturing the bent airfoil with cooling channels following the airfoil geometry with wall thickness as thin as in straight airfoils. As an example, a cooled airfoil may be provided with a wall thickness at the leading edge in a range from 2.5 to 2.9 mm, and at the trailing edge in a range from 1.3 to 1.5 mm.

It is understood that the airfoil geometry proposed herein and the method disclosed are tightly related to each other. The method allows to reduce tolerances of the location of the cooling channels to be provided in the airfoil, or, tightly correlated therewith, the airfoil wall thickness, respectively, while on the other hand the airfoil geometry is adapted to and well suited for the method of manufacture.

In a more particular embodiment of the airfoil, in an axial view, the airfoil at the leading edge is straight at least in the first airfoil height section. This further reduces the dimensional tolerances of the airfoil walls. In even more particular embodiments, the airfoil, in the axial view, is curved in the second airfoil height section and more in particular may be concavely curved on the suction side at the leading edge in the second airfoil height section.

Further, the airfoil may be provided such that, in an axial view, the airfoil at the trailing edge is straight in the first airfoil height section. This results in a further improvement of the airfoil wall accuracy at the trailing edge. More in particular, the airfoil may be characterized in that in the axial view the airfoil is curved in the second airfoil height section and may more in particular be concavely curved on the pressure side at the trailing edge in the second airfoil height section.

It is appreciated that, in view of the embodiments described above, the airfoil, in an axial view, is straight adjacent to the hub end. This results in a potentially lower degree of aerodynamic optimization than in the art described in, for instance, US 2012/0076646. However, it allows providing the airfoil with internal cooling channels and with accurately cast wall thickness.

According to further aspects of the present disclosure, the airfoil may be characterized in that it comprises an internal leading edge cooling channel adjacent the leading edge, characterized in that the leading edge cooling channel at least generally follows the shape of the leading edge. It may be characterized in that it comprises an internal trailing edge cooling channel adjacent the trailing edge, wherein the trailing edge cooling channel at least generally follows the shape of the trailing edge. Thus, a cooling channel may be provided at the leading edge and/or the trailing edge, with the wall thickness being at least essentially constant along the leading edge and/or the trailing edge, and may be manufactured with small tolerances, allowing low wall thickness as noted above.

In still another aspect, the airfoil may be characterized in that the first airfoil height section covers 40% or more of the airfoil total height, starting at the hub end of the airfoil. That is, the straight section may comprise as little as 40% of the total airfoil height, in which respect the airfoil as described herein is defined over the art known from US 2012/0076646.

According to another aspect of the present disclosure, said dimensions may be defined in relation to the leading edge and trailing edge height. In that respect, the airfoil may be shaped straight at the leading edge at least along 40% of the leading edge length from the airfoil hub end to the airfoil tip. The airfoil may be shaped straight at the trailing edge at least along 40% of the trailing edge length from the airfoil hub end to the airfoil tip.

Further disclosed is a cooled turbine guide vane, which comprises an airfoil as described above, and a vane radially outer platform or tip platform provided at the tip, wherein the airfoil extends from a hot gas side of the tip platform and wherein the vane tip platform is provided with attachment means for fixing the vane to a turbine stator, the attachment means being provided opposite the hot gas side of the tip platform.

In a more particular embodiment of the vane, at least one of the leading edge and the trailing edge at the airfoil tip forms an angle with the hot gas side of the tip platform, when seen in the meridional view of the airfoil, or the vane, respectively, wherein said angle is 90°±15°. The airfoil is then particularly well adapted to the stator hade angle, and thus to the working fluid flow.

In a further embodiment of the vane, the vane comprises a radially inner or hub platform at the airfoil hub end, the hub platform comprising a hub platform hot gas side from which the airfoil extends. At least one of the leading edge and the trailing edge at the airfoil tip forms an angle with the hot gas side of the hub platform, wherein said angle is 90°±15°. This improves the working fluid flow at the hub.

It is understood that in a transition area between the airfoil and the tip platform or the hub platform, respectively, chamfers and/or radii may be present, such that the physical transition may appear slightly different. The above-described angles formed between the actual trailing and leading edge and the tip platform and/or hub platform will nevertheless be apparent to the skilled person.

In this respect, it is understood that the production method disclosed above may also be applied to the manufacturing of a guide vane.

Further disclosed is a gas turbine engine which comprises a cooled guide vane as described above, wherein the guide vane is in particular a guide vane of at least one of a third and fourth turbine stage. In particular in these stages large hade angles are found and an airfoil design taking the divergence of the working fluid flow into account may be found particularly beneficial. It is found that the stage efficiency may be improved by up to 0.3 percentage points compared with a design in which straight airfoils are applied. At the same time, due to the specific airfoil geometry and the production method disclosed above, wall thickness deviations of the airfoil may be reduced by up to 601% and even more compared to a full 3 dimensional design. This in turn allows for thinner and better controlled wall thickness, thus enhancing the cooling efficiency, potentially reducing the coolant mass flow, and thus further improving the overall engine efficiency.

It is understood that the features and embodiments disclosed above may be combined with each other. It will further be appreciated that further embodiments are conceivable within the scope of the present disclosure and the claimed subject matter which are obvious and apparent to the skilled person.

BRIEF DESCRIPTION OF THE DRAWINGS

The subject matter of the present disclosure is now to be explained in more detail by means of selected exemplary embodiments shown in the accompanying drawings. The figures show FIG. 1 a meridional view of a part of a hot gas path of an expansion turbine.

It is understood that the drawings are highly schematic, and details not required for instruction purposes may have been omitted for the ease of understanding and depiction. It is further understood that the drawings show only selected, illustrative embodiments, and embodiments not shown may still be well within the scope of the herein claimed subject matter.

EXEMPLARY MODES OF CARRYING OUT THE TEACHING OF THE PRESENT DISCLOSURE

Figure 1:
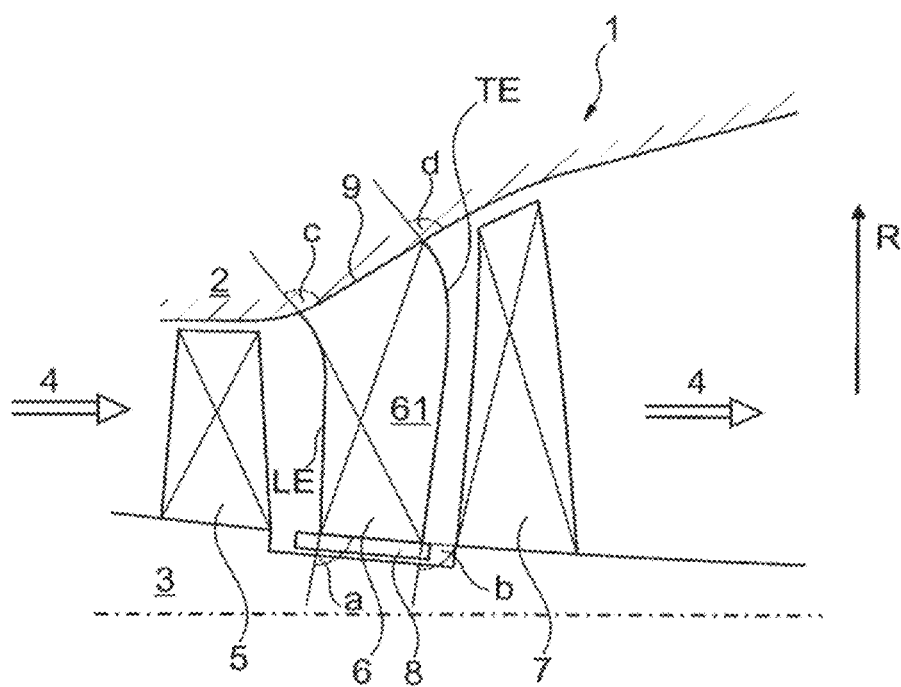

FIG. 1 shows a schematic view of some blades and vanes arranged in a part of the expansion turbine 1 of a gas turbine engine in a longitudinal cut, that is, in a meridional view. Gas turbine engine 1 comprises housing 2, or stator, respectively, and rotor shaft 3. Rotating turbine blades 5 and 7 are fixedly attached to the rotor shaft 3. A flow of hot working fluid flows through the turbine in a principal direction depicted at 4, and is expanded, while performing useful work at the rotating blades 5 and 7. Upstream of each blade, a stationary guide vane is provided, which directs the working fluid flow to the rotating blades with a circumferential velocity component. Shown in this embodiment is guide vane 6, which acts as a guide vane for blade 7. Guide vane 6 comprises an airfoil 61, which comprises a hub end or radially inner end 8, and a tip or radially outer end 9. A radial direction is shown at R. Hub end 8 faces the rotor shaft 3, while tip end 9 faces the housing 2. The guide vane 6 is fixedly attached to the housing 2. The working fluid flow channel in which the blades and vanes are arranged is strongly divergent. The flow thus also is not only axially oriented, as implied at 4, but also has a radial component, in particular at the radially outer side of the flow channel. In order to improve aerodynamics of the guide vane 6, the airfoil 61 is bent, such that, generally spoken, the airfoil in the meridional view is concave at the leading edge LE, and is convex at the trailing edge TE. The curvature is in particular chosen such that the leading edge LE at the airfoil hub end forms an angle a with a radially inner wall of the working fluid flow channel, and forms at the airfoil tip an angle c with a radially outer wall of the working fluid flow channel. Likewise, the geometry of the airfoil 61 at the trailing edge TE is chosen such that at the airfoil hub end forms an angle b with the radially inner wall of the flow channel, and forms at its tip an angle d with a radially outer wall of the flow channel. The radially inner wall of the flow channel may be provided by the rotor shaft 3, or by a hot gas side of a hub platform of the vane. The radially outer wall of the flow channel may be provided by the hot gas side of a vane tip platform. The angles a, b, c and d are 90°±15°. Vane 6 and the geometry of the airfoil 61 will be lined out in more detail below.

Figure 2:
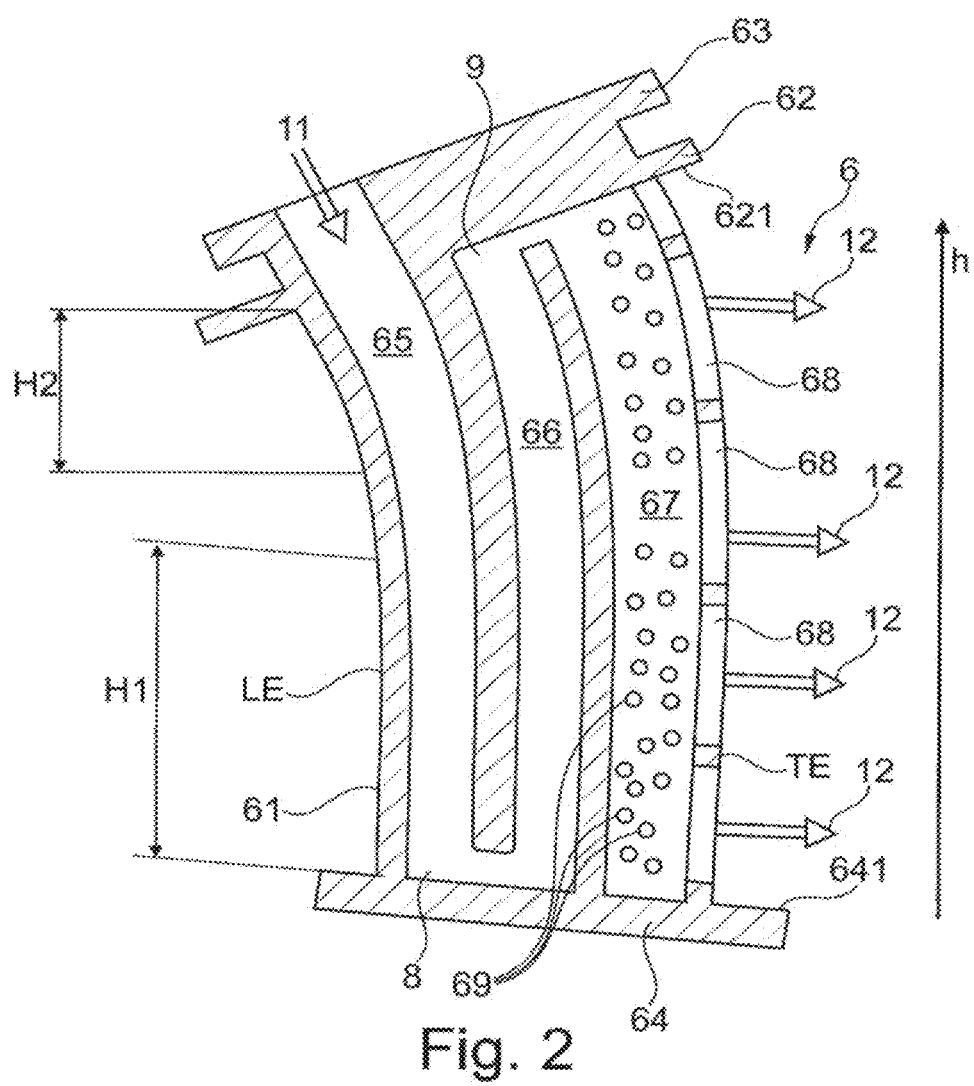
FIG. 2 a cut through a cooled guide vane.

FIG. 2 depicts a cut through an exemplary guide vane 6 in a meridional view. The vane 6 comprises an airfoil 61, wherein said airfoil comprises a hub end 8 and a tip 9. By virtue of the intended arrangement in the gas turbine engine, the hub end 8 may also be referred to as a radially inner end, and the tip 9 may be referred to as a radially outer end. The airfoil extends along a height h from the hub end 8 to the tip 9. A tip platform 62 is arranged at the tip of the airfoil 61. The tip platform 62 comprises a hot gas side 621. Furthermore, means 63 are arranged at the tip platform for fixedly attaching the guide vane to the turbine housing. At the hub end 8, vane hub platform 64 is provided. The vane hub platform comprises a hot gas side 641. The leading edge LE is straight at least in a first section H1 of the airfoil 61 extending from the hub end 8 and towards the tip 9. The leading edge LE is, in the meridional view, concavely bend in a second region H2 of the airfoil, starting from the tip 9 and extending towards the hub end 8. Likewise, the trailing edge TE is, in the meridional view, straight at least in the first section H1 of the airfoil 61, and is convexly bend in the second section of the airfoil adjacent the airfoil tip 9. A transitional section of the airfoil 61 may be interposed between the first section H1 and the second section H2. Moreover, cooling channels 65, 66 and 67 are provided in the airfoil 61, and extend along the height h of the airfoil 61 between the tip 9 and the hub end 8. The cooling channels 65, 66, 67 are arranged in series, and, in combination, form an airfoil internal coolant duct. Coolant 11 is received by a leading edge cooling channel 65 which is open towards the housing and is in fluid communication with a gas turbine cooling system, and is guided through leading edge cooling channel 65, through cooling channel 66, and finally into trailing edge cooling channel 67. From the trailing edge cooling channel 67, the coolant is discharged as a coolant discharge flow 12 through trailing edge cooling slots 68, and cooling holes 69. The coolant channels 65, 66, and 67 generally follow the geometry of the airfoil 61 in the meridional view, that is, the cooling channels run straight in the first section of the airfoil, and are bent in a second section of the airfoil, whereas walls delimiting the cooling channels are convexly shaped on a leading edge side of the cooling channels, and are concavely shaped on a trailing edge side of the cooling channels.

Figure 3:
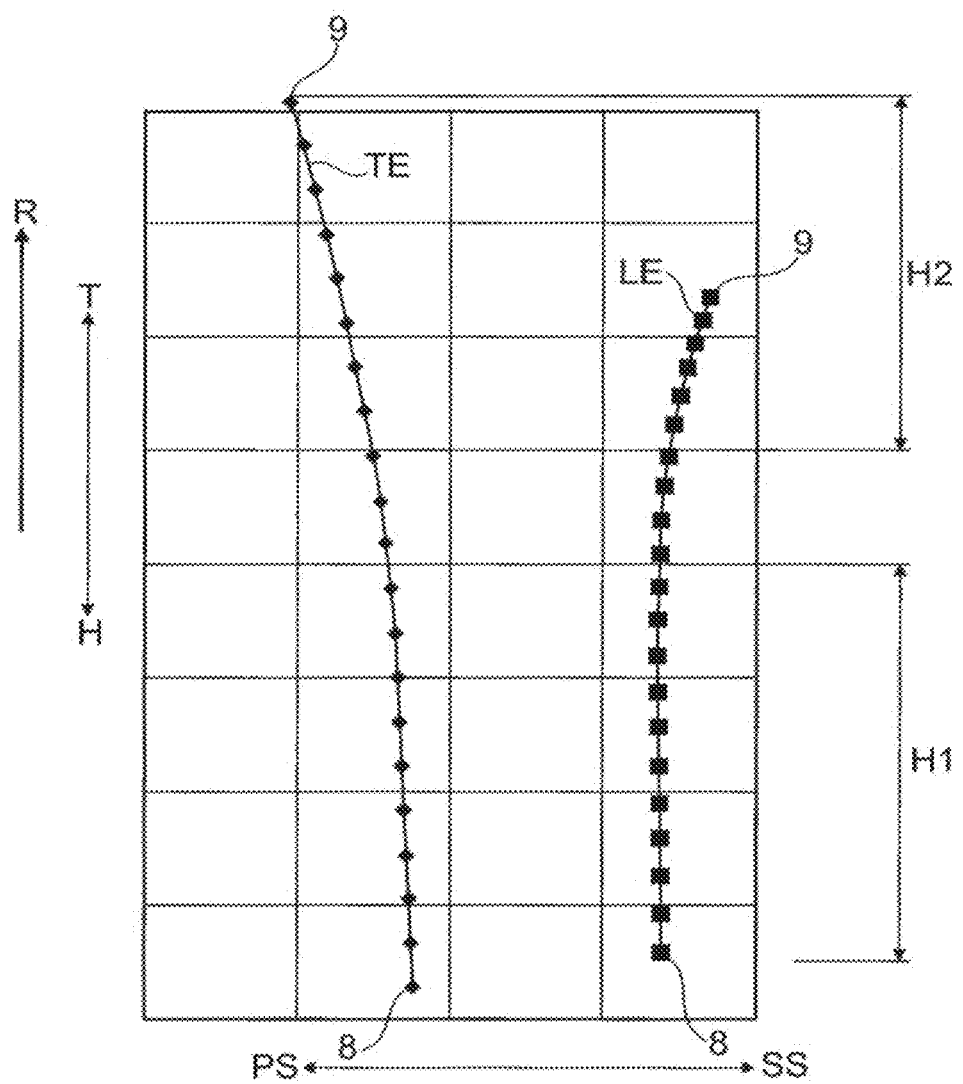
FIG. 3 a diagram depicting the leading edge and trailing edge geometry in an axial direction.

With reference to FIG. 3, an exemplary geometry of the leading edge LE and the trailing edge TE is shown in an axial view of the guide vane, that is, along a gas turbine rotor axis. The leading edge and the trailing edge generally extend between the hub end 8 and the tip 9. Said radial direction R is also depicted at H, pointing towards the hub, and T, pointing towards the tip. The airfoil generally also comprises a pressure side PS and a suction side SS. The leading edge and the trailing edge extend straight, starting at the hub end 8, and in a first section H1, and are bent in the second section of the airfoil H2. The trailing edge TE is bent such that it is concave on the pressure side of the airfoil, while the leading edge LE is bent such that it is concave on the suction side of the airfoil.

As is apparent, the airfoil is straight along its radial extent, or height extent, in a first airfoil section H1 starting at the hub end 8 in a meridional view as well as in an axial view.

Figure 4:
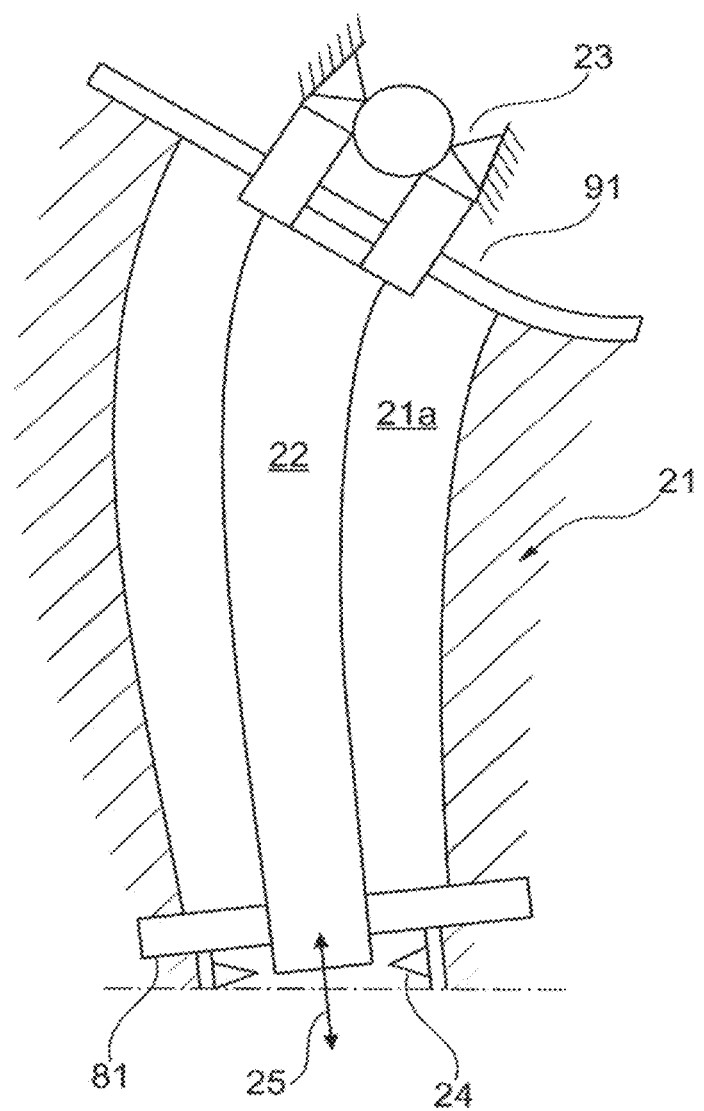
FIG. 4 a schematic depiction of a casting process, or a mold for a casting process, respectively, as herein described.

A method for manufacturing an airfoil, or vane, respectively, as described above by casting with high precision of the wall thickness is now lined out in relation with FIG. 4. A ceramic mold 21 is provided and is shaped such that the outer geometry of the airfoil may be manufactured by casting. A mold cavity 21a is provided inside the mold 21 as a space intended to receive molten material during the casting process, and is delimited by walls of the mold. The walls define the outer geometry of the member to be manufactured by casting. A core 22 is provided for manufacturing a cooling channel. Both, the mold cavity 21a and the core 22, are bent adjacent a tip end 91, and are straight adjacent a hub end 81. The core 22 is supported in a fixed bearing relationship at 23, adjacent the bent core section. It is furthermore supported in a floating bearing relationship at 24, adjacent the straight core section. Thus, during the casting process, the core 22 may displace inside the mold cavity 21a along the arrow depicted at 25 in response to differential thermal expansion. Said displacement, however, takes place along a lengthwise direction of the core 22, and thus the manufactured wall thickness of the airfoil is not impacted. Thermal expansion in the bent core section is restricted to a short level of expansion, and thus the influence of core displacement on the manufactured wall thickness is largely restricted. This allows the airfoil, or vane, respectively as disclosed above to be manufactured with highly precise thickness of the airfoil walls around the cooling channels.

Summarizing, the geometry of the airfoil is chosen such that an aerodynamic efficiency gain is achieved while at the same time it may be manufactured applying a method allowing for high precision casting of the wall thickness, which in turn enable highly efficient use of the coolant provided to cool the airfoil.

While the subject matter of the disclosure has been explained by means of exemplary embodiments, it is understood that these are in no way intended to limit the scope of the claimed invention. It will be appreciated that the claims cover embodiments not explicitly shown or disclosed herein, and embodiments deviating from those disclosed in the exemplary modes of carrying out the teaching of the present disclosure will still be covered by the claims.

LIST OF REFERENCE NUMERALS 1 turbine
2 housing, stator
3 rotor shaft
4 main working fluid flow direction
5 running blade, rotating blade
6 guide vane
7 running blade, rotating blade
8 hub end
9 tip
11 coolant supply flow
12 coolant discharge flow
21 ceramic mold
21a mold cavity
22 core
23 fixed bearing
24 floating bearing
25 thermal displacement direction
61 airfoil
62 vane tip platform
63 vane attachment means
64 vane hub platform
65 cooling channel
66 cooling channel
67 cooling channel
68 trailing edge coolant discharge slots
69 coolant discharge openings, cooling holes
81 hub end of mold
91 tip end of mold
621 vane tip platform hot gas side
641 vane hub platform hot gas side
a angle
b angle
c angle
d angle
h airfoil height
H hub T tip
LE leading edge
TE trailing edge
PS pressure side
SS suction side
H1 first airfoil section, airfoil hub section
H2 second airfoil section, airfoil tip section
R radial direction

The invention claimed is:

1. A method for manufacturing an airfoil, the method comprising:
   providing a mold, the mold being provided to generate the outer surface shape at least of the airfoil in a casting process;
   providing at least one core, the core being provided to generate at least one internal cooling channel in the airfoil in the casting process;
   each of the mold and the core containing a hub end and a tip end, and an airfoil length extending between the hub end and the tip end;
   each of a cavity of the mold, and the core, containing a straight section provided adjacent the respective hub end and a bent section provided adjacent the respective tip end;
   placing the core inside the mold cavity;
   placing the core bent section inside the mold cavity bent section;
   placing the core straight section inside the mold cavity straight section;
   wherein the core is attached to the mold in a fixed bearing relationship at the core tip end; and
   wherein the core is attached to the mold in a floating bearing relationship at the core hub end such that the core hub end will displace relative to the mold along a lengthwise direction of the core straight section and is fixed relative to the mold in any direction across the lengthwise direction of the core straight section.

2. The method according to claim 1, comprising:
   manufacturing a vane with the airfoil.

* * * * *